United States Patent
Greenwald

(10) Patent No.: US 6,231,099 B1
(45) Date of Patent: May 15, 2001

(54) RECONFIGURABLE GLOVE BOX BIN

(75) Inventor: Pamela Sue Greenwald, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/419,366

(22) Filed: Oct. 15, 1999

(51) Int. Cl.$^7$ ................... B60N 3/12; B65D 1/24
(52) U.S. Cl. ............ 296/37.8; 296/37.12; 220/531; 220/533; 220/552
(58) Field of Search ............... 296/37.1, 37.12, 296/37.6, 37.8; 312/348.3; 224/483, 277, 539, 542; 220/529, 531, 532, 533, 544, 552; 150/150

(56) References Cited

U.S. PATENT DOCUMENTS

| | | | | |
|---|---|---|---|---|
| 598,801 | * | 2/1898 | Minter | 220/529 |
| 948,434 | * | 2/1910 | Scott | 220/532 |
| 1,009,451 | * | 11/1911 | Subert | 220/532 |
| 1,688,887 | * | 10/1928 | Spreen | 220/552 |
| 1,980,807 | * | 11/1934 | Lambert | 220/533 |
| 2,081,078 | * | 5/1937 | Watson | 220/533 |
| 2,175,949 | * | 10/1939 | Allen | 220/533 |
| 2,215,208 | | 9/1940 | Burkhart | 108/33 |
| 2,221,024 | * | 11/1940 | Hood | 220/533 |
| 2,226,434 | * | 12/1940 | Hirsh | 296/37.12 |
| 2,598,789 | * | 6/1952 | Harrell | 220/531 |
| 2,645,127 | * | 7/1953 | Parks | 220/532 |
| 2,681,730 | * | 6/1954 | Carne | 220/533 |
| 2,820,687 | | 1/1958 | Waring | 312/350 |
| 2,985,333 | | 5/1961 | Kirkman | 220/533 |
| 3,386,765 | * | 6/1968 | Drach, Jr. | 296/37.12 |
| 3,414,318 | * | 12/1968 | Porsche | 296/37.12 |
| 3,503,648 | * | 3/1970 | James | 296/37.12 |
| 4,099,814 | | 7/1978 | Hasselberger | 312/205 |
| 4,593,816 | * | 6/1986 | Langenbeck | 220/532 |
| 4,811,981 | | 3/1989 | Benson | 296/37.12 |
| 5,074,777 | * | 12/1991 | Garner | 220/531 |
| 5,143,265 | | 9/1992 | Schultz | 224/483 |
| 5,197,775 | | 3/1993 | Reeber | 296/37.12 |
| 5,484,078 | | 1/1996 | Bronovicki | 220/531 |
| 5,526,972 | * | 6/1996 | Frazier et al. | 296/37.6 |
| 5,584,412 | | 12/1996 | Wang | 220/500 |
| 5,626,380 | | 5/1997 | Elson et al. | 296/39.1 |
| 5,931,632 | * | 8/1999 | Dongilli et al. | 296/37.6 |

* cited by examiner

Primary Examiner—D. Glenn Dayoan
Assistant Examiner—Hilary Gutman
(74) Attorney, Agent, or Firm—Kathryn A. Marra

(57) ABSTRACT

A reconfigurable glove box bin having a main body portion and at least one primary partition. The primary partition is maintained in place by frictional engagement, interference engagement, or a combination of a frictional and interference engagement between at least one inner panel surface or with at least one side panel groove portion upon the inner surface. Additional groove or slot portions may be provided for additional versatility. Furthermore, one or more secondary partitions may be provided to divide compartments into subcompartments.

14 Claims, 6 Drawing Sheets

RECONFIGURABLE GLOVE BOX BIN

TECHNICAL FIELD

The present invention relates generally to glove box bins, and more particularly, to glove box bins having reconfigurable storage compartments.

BACKGROUND OF THE INVENTION

It is well known in motor vehicles to provide a storage compartment, or glove box bin, for storing gloves, maps, etc., on the instrument panel generally facing the occupants of the vehicle or in another convenient location. Glove box bins are typically fitted to an opening in the instrument panel and generally include a glove box door, which is pivotable relative to the instrument panel. In a closed position, the glove box bin closes the opening and is generally flush with the instrument panel. In other vehicles the glove box bin may be in the form of a drawer which pulls rearwardly out of the opening in the instrument panel. The drawer has a closure panel mounted thereon. Other glove box bins may have the door and storage compartment formed integrally so that upon opening the integral unit pivots outwardly from the instrument panel. These types of glove box bins generally have a forward and/or downward sloping bottom surface where objects are stored.

As a result of normal motions of the vehicle, items stored within the glove box bin tend to become mixed with one another with the smaller and heavier items migrating to the lowermost point or rattling throughout the glove box bin. As many glove compartments in automobiles have a sloping bottom surface, the smaller items tend to become stacked upon one another along the lowermost portion and render retrieval of any selected item inconvenient. Items may be difficult to locate and upon retrieval cause inadvertent removal of other items that may end up on the floor of the vehicle.

SUMMARY OF THE INVENTION

According to the present invention, a configurable glove box bin for vehicles is provided. The glove box bin includes a plurality of compartments that may be easily and conveniently configured depending upon the desires of a particular user. The glove box bin of the present invention is adaptable for different types of glove boxes or automotive interior storage compartments, including those that utilize a pull-out drawer, those that pivot at the door to open and those that pivot entirely upon opening.

BRIEF DESCRIPTION OF THE DRAWINGS

Referring now to the drawings wherein like elements are numbered alike in the several Figures.

DESCRIPTION OF AN EMBODIMENT OF THE INVENTION

Figure 1A:
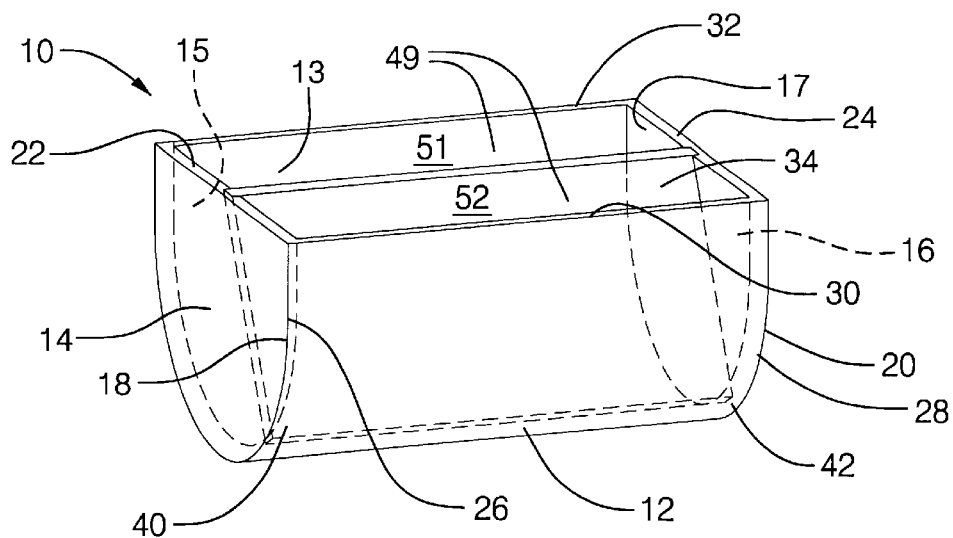
FIG. 1A is a front perspective view of a glove box bin according to a first embodiment of the present invention.

Referring to FIG. 1A, a perspective view of a glove box bin according to one embodiment of the present invention is generally depicted and indicated at (10). Glove box bin (10) is intended for use, for example, in an instrument panel of a vehicle as a pivoting glove box further comprising a handle (not shown) and latching mechanism (not shown) or as a stationary glove box having a separate door (not shown). Glove box bin (10) is shown as a trough-like structure having a body portion (12) including an inner surface (13) forming the surface of a storage compartment (49) and a pair of side panels (14) and (16) generally perpendicular or orthogonal relative to body portion (12). Side panels (14) and (16) have U-shaped perimeter edges (18) and (20) and top side edges (22) and (24) respectively. Body portion (12) has opposing distal ends forming a pair of continuous arcuate U-shaped body edges (26) and (28) joining with the generally U-shaped side panel perimeter edges (18) and (20). Body portion (12) also includes top cross body edges (30) and (32).

It is understood that side panels (14) and (16) may be at an obtuse or acute angle relative to body portion (12), may be curved inwardly or outwardly, or may be convex or concave. Furthermore, it is also understood that body portion (12) may alternatively comprise a separate bottom portion, frontwall portion and rearwall portion, that is, generally in the shape of a open rectangular prism shaped box. These various design configurations are dependant on the specific vehicle and application where glove box bin (10) is used and the desired functionality thereof.

Figure 1B:
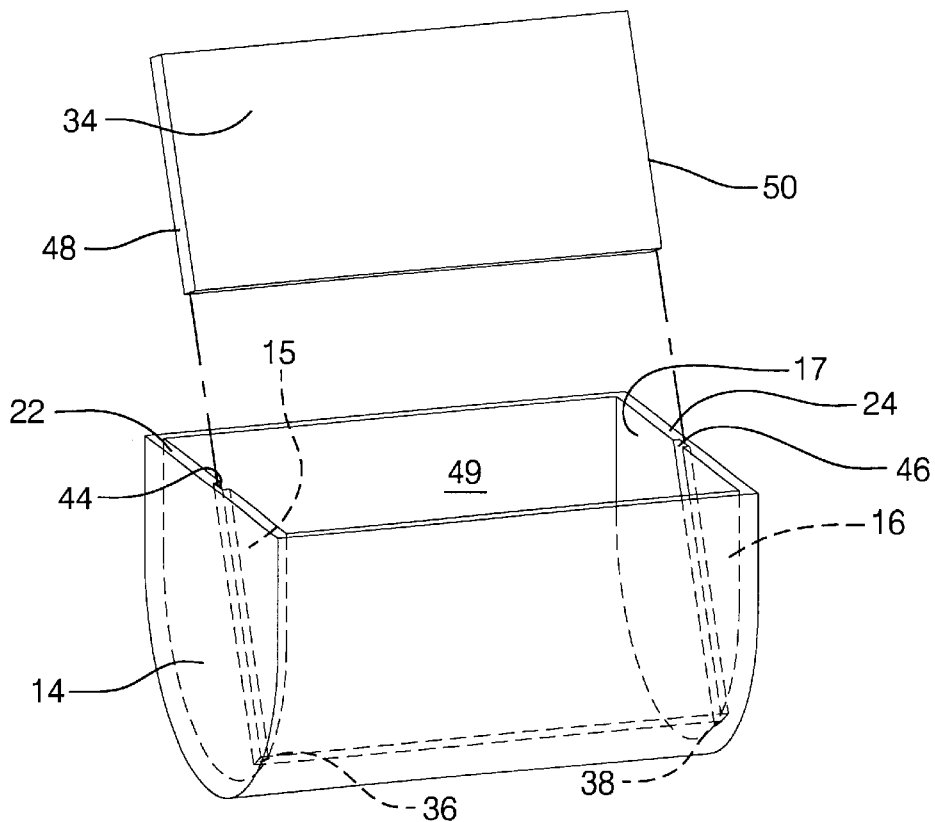
FIG. 1B is an exploded front perspective view of the glove box bin depicted in FIG. 1A.

Referring to FIGS. 1A and 1B, a partition (34) (shown partially in phantom view) is disposed horizontally between side panels (14) and (16) and disposed vertically upstanding in relation to the inner surface (13). Preferably, the bottom edge of partition (34) is adjacent to the inner surface (13) upon a line having one endpoint at a bottom corner (36) defined generally at the juncture of body portion edge (26) and side panel perimeter edge (18), and another endpoint at a bottom corner (38) defined generally at the juncture of body portion edges (28) and side panel perimeter edges (20). Junctures (40) and (42) are generally offset from the center point at the base of the "U" upon U-shaped body portion edges (26) and (28) and side panel perimeter edges (18) and (20).

Partition (34) is removably disposed within storage region (49) of glove box bin (10) thereby providing separate compartments (51) and (52). Preferably, it is removably disposed by means of a frictional engagement, interference engagement or a combination of a frictional and interference engagement with at least one of the side panels (14) and (16). This engagement may be effectuated, for example, by a frictional engagement with inside panel surfaces (15) and (17) of both side panels (14) and (16), an interference engagement with a rectangular slot disposed upon an inside panel surface (15) or (17), a combined frictional and interference engagement with an arcuate groove or rectangular slot disposed upon one or both inside panel surfaces (15) and/or (17), or by an interlocking arrangement such as a dovetail arrangement disposed upon one or both inside panel surfaces (15) and/or (17). Preferably, the groove, slot, or other arrangement is molded or preformed within one or both of inside panel surfaces (15) or (17).

Referring to FIG. 1B, where partition (34) and body (12) of glove box bin (10) are shown in an exploded view, the receiving portions of the integral engagements are shown as grooves in the shape of rectangular slots (44) and (46) formed within inside panel surfaces (15) or (17). Side edges (48) and (50) of partition (34) generally interface with slots (44) and (46) respectively. Preferably slots (44) and (46) extend generally from top side edges (22) and (24) to bottom corners (36) and (38). The optimal width of slots (44) and (46) is determined by the thickness of partition side edge (48) and (50). For a secure frictional engagement within the slots (44) and (46), the slot width is marginally greater than the partition thickness.

Additionally, the dimensions of slots (44) and (46) may vary depending on factors such as the strength desired of the engagement between partition (34) and inside panel surfaces (15) or (17), the materials of construction, etc. In a preferred embodiment where the bottom edge of partition (34) is adjacent to the inner surface (13), slots (44) and (46) extend to bottom corners (36) and (38). However, in other embodiments where there is a gap between the bottom of partition (34) and inner surface (13), slots (44) and (46) may extend to a point upon inside panel surfaces (15) and (17) other than bottom corners (36) and (38).

The length of partition (34) is preferably approximately equal to the sum of the depth of slots (44) and (46) and the distance between inside panel surfaces (15) and (17) at the slot locations. This optimal length prevents movement of partition (34) within glove box bin (10) and ensures a secure engagement.

Thus, by inserting partition (34) into glove bin box (10), two distinct compartments (51) and (52) are provided. Alternatively, partition (34) may be removed thereby providing a single compartment within glove box bin (10). It is understood that variations in the configurations of slots (44) and (46) (i.e., dimensions, shapes, etc.) are possible. For example, in lieu of an open gap at top side edges (22) and (24), slots (44) and (46) may commence upon inside panel surfaces (15) and (17) lower than top side edge (22) and (24). In this embodiment, partition (34) is placed within glove box bin (10) and positioned such that edges (48) and (50) of partition (34) fit into slots (44) and (46) and is prevented from being displaced vertically from body portion (12).

Figure 2:
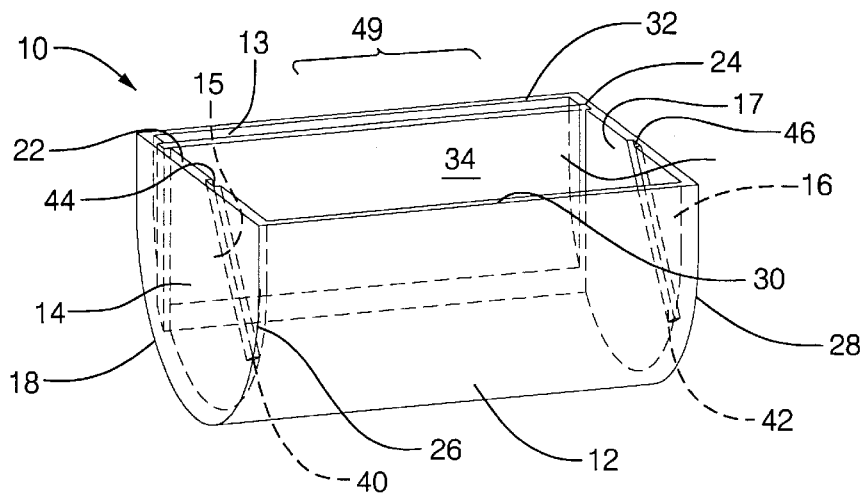
FIGS. 2A and 2B are front perspective views of a glove box bin according to another embodiment of the present invention.
Figure 2:
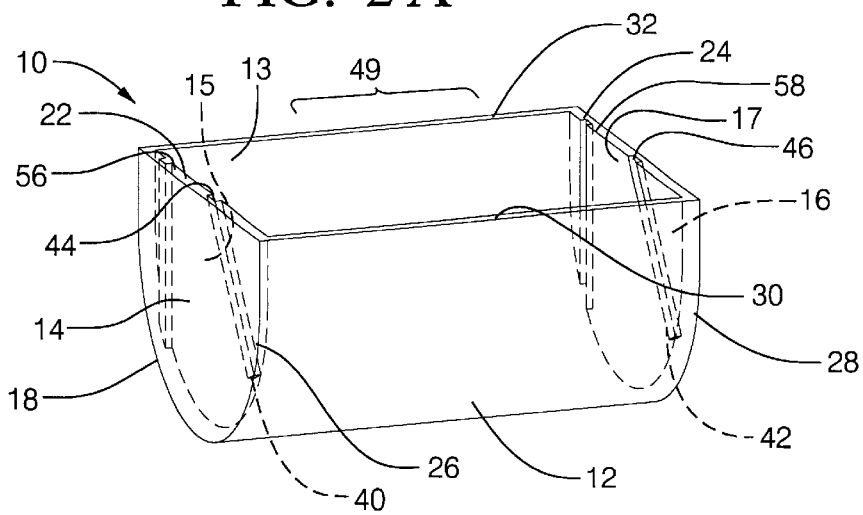

FIGS. 2A and 2B depict another embodiment of the present invention similar to the embodiment of FIGS. 1A and 1B, further including slots (56) and (58) located upon inside panel surfaces (15) and (17) of side panels (14) and (16) extending from the top side edges (22) and (24). Slots (56) and (58) are provided as to create a partition storage location to allow a user to insert the partition therein as to eliminate the separate compartments, as depicted in FIG. 2A. Slots (56) and (58) are depicted as generally parallel to the straight portion of the "U" upon surface portion edges (26) and (28) and side panel perimeter edges (18) and (20). In choosing dimensions for slots (56) and (58), the same considerations are contemplated as with the dimensions for slots (44) and (46). Furthermore, the length of slots (56) and (58) are determined by the dimensions of partition (34) and the desired position of partition (34) when the partition storage location is in use (i.e., the desired height of the partition while stored). Preferably, the length of slots (56) and (58) allow partition (34) to be stored without obstructing top body portion (32) and further without compromising the availability of storage space. Additionally, there may be a small distance, (i.e., 1–5 mm), between a surface of partition (34) and interior surface (13). Such an arrangement may provide a compartment for storing generally flat items such as cards or papers.

Figure 3:
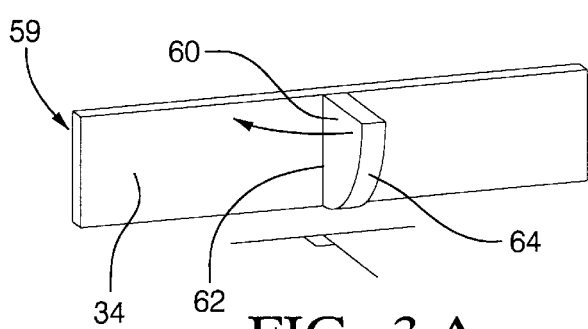
FIGS. 3A and 3B are front perspective views of a partition having a secondary partition in an open position and a closed position, respectively.
Figure 3:
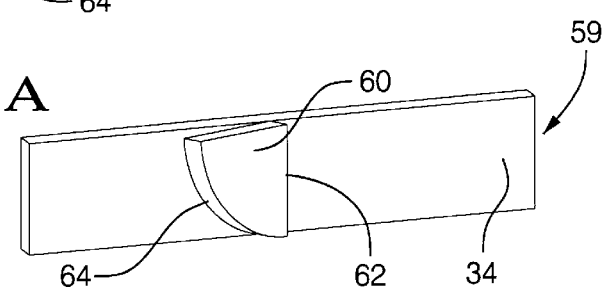
Figure 4:
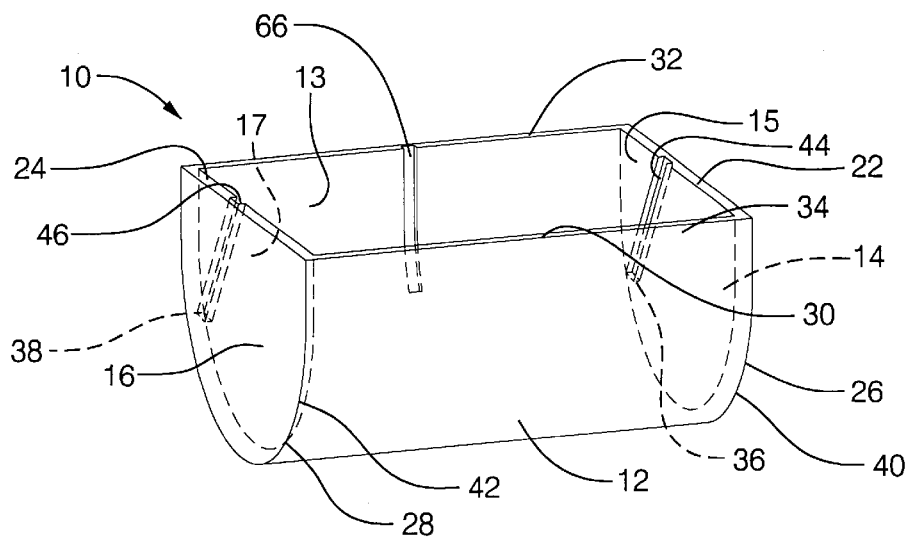
FIG. 4A is a side perspective view of a glove box bin according to an additional embodiment of the present invention.
FIG. 4B is a rear perspective view of the glove box bin of FIG. 4A with the partition in place.
Figure 4:
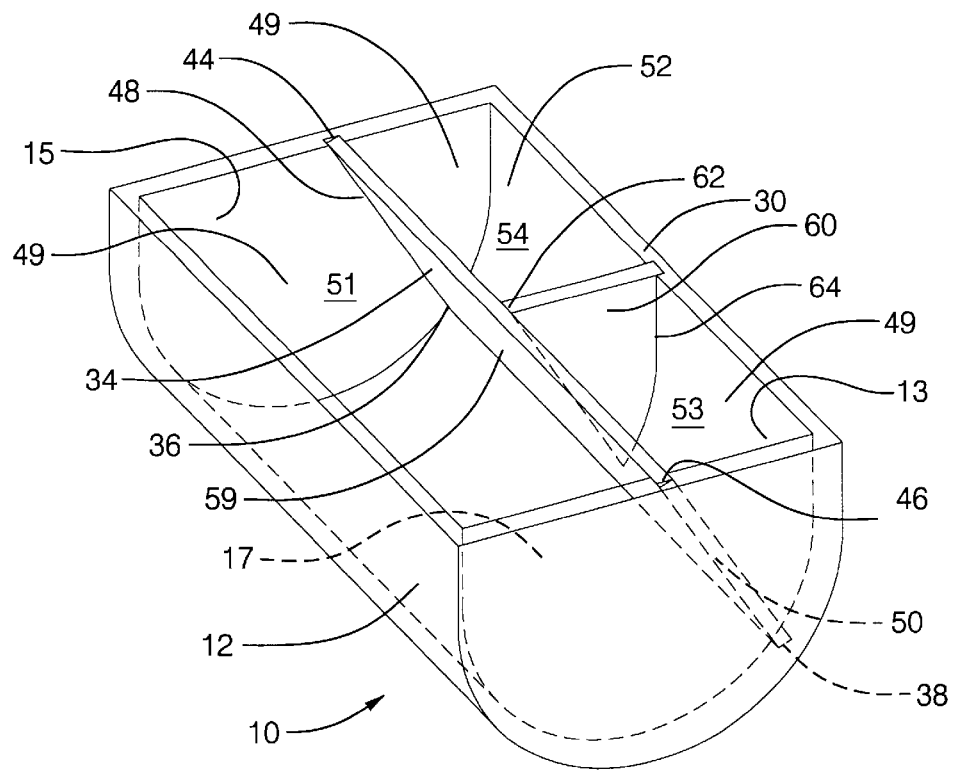

FIGS. 3A and 3B depict one exemplary embodiment of partition (34) having a pivotally attached secondary partition (60) thereby forming partition assembly (59). FIG. 3A depicts secondary partition (60) in an open position, whereby the plane created by secondary partition (60) is substantially perpendicular to the plane created by partition (34). FIG. 3B depicts secondary partition (60) in a closed position, whereby the plane created by secondary partition (60) is substantially adjacent to the plane created by partition (34). Secondary partition (60) pivots about a connecting member (62). Connecting member (62) may comprise one or more hinges or may comprise an integral attachment between secondary partition (60) and partition (34) having a score sufficient to permit the pivotal attachment described herein. An outer secondary partition edge (64) is depicted in this embodiment as being arcuate, as to conform to the shape of inner surface (13) of body (12) (Depicted in FIG. 4A). Secondary partition (60) may be held in the closed position by, for example, integral snaps (not shown) molded into partition (34) that correspond with receiving portions molded into secondary partition (60), or vice versa, hook and loop fasteners (not shown), or other known means to easily removably attach generally flat bodies to one another.

FIG. 4B depicts a compartmentalized glove box bin (10) having compartments (51) and (52) within storage region (49) as described above with reference to FIG. 1A further divided into sub-compartments (53) and (54) by partition assembly (59) including secondary partition (60) integral with main partition (34). For example, partition assembly (59) including secondary partition (60), as depicted in FIGS. 3A and 3B, may be used as the partition in glove box bin (10) as depicted in FIG. 4B.

Partition assembly (59), having secondary partition (60) in the closed position, is inserted into glove box bin (10) by aligning partition side edges (48) and (50) and slots (44) and (46), and urging the partition into the glove box bin (10) along slots (44) and (46). The force required to insert partition assembly (59) into the glove box bin (10) depends primarily on the variation between the thickness of side edges (48) and (50) and the widths of slots (44) and (46). Secondary partition (60) may be opened after partition assembly (59) is inserted, in the direction provided by connecting member (62). In preferred embodiments, the shape of secondary partition outer edge (64) mimics the contour of inner surface (13) such that a secure fit is accomplished and the gap between secondary partition outer edge (64) and inner surface (13) is minimized. In a most preferred embodiment, secondary partition outer edge (64)

and interior surface (13) are in contact such that there is no gap therebetween.

Alternatively, the outer edge contour and the surface portion contour, secondary hinge partition (60) may be in the open position (as depicted in FIG. 3A, for example) and inserted in the same manner as if secondary partition (60) were closed, whereby outer edge (64) is in contact with or is adjacent to inner surface (13) during insertion.

Referring to FIGS. 4A and 4B, another embodiment is depicted in FIG. 4A having a slot (66) formed in inner surface (13) of body (12) complementary with secondary partition outer edge (64). In choosing dimensions for slot (66), the same considerations are contemplated as with the dimensions for slots (44), (46), (56) and (58). In this embodiment, partition assembly (59) may be inserted as heretofore described while maintaining secondary partition (60) in the open position. Preferably, secondary partition (60) is shaped such that when inserted into slot (66) as described herein, a tight fit is established. Secondary partition outer edge (64) may be aligned with slot (66) upon insertion of partition side edges (48) and (50) into respective slots (44) and (46). Alternatively, partition assembly (59) may be inserted while secondary partition (60) is maintained in the closed position such as by interlocking snaps or hook and loop fasteners. If the user wishes to open secondary partition (60) while partition assembly (59) is inserted, it may be opened and laterally urged into slot (66). A certain degree of material flexibility is desirable within the partition and/or secondary partition when such use is contemplated, so that the secondary partition may partially deform and reestablish its original shape upon insertion into the slot when the stress is removed.

Figure 5:
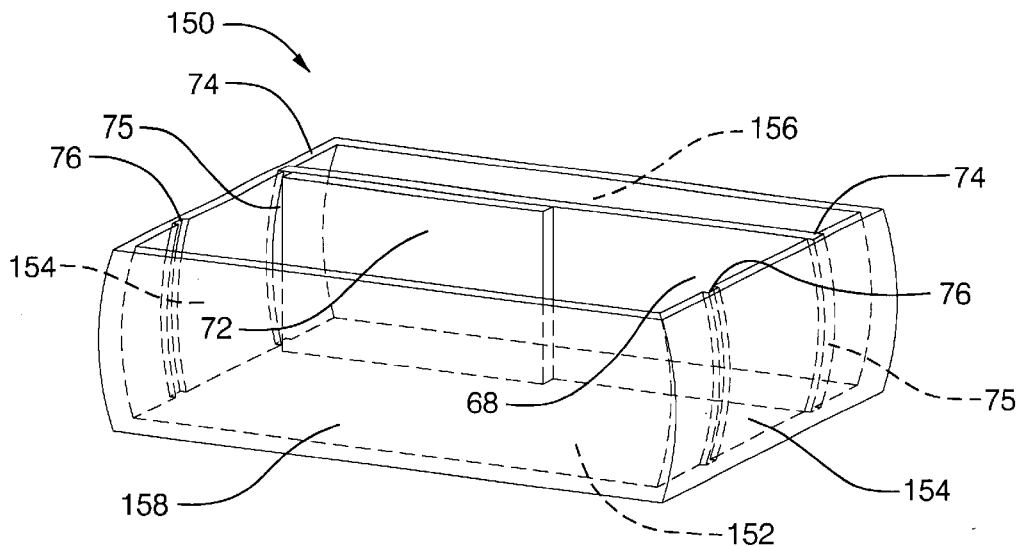
FIG. 5A is a front perspective view of a glove box bin according to another embodiment of the present invention.
FIG. 5B is a top plan view of the glove box bin of FIG. 5A.
FIG. 5C is a top plan view of the glove box bin of FIG. 5A having a main partition and a secondary partition in open positions.
Figure 5:
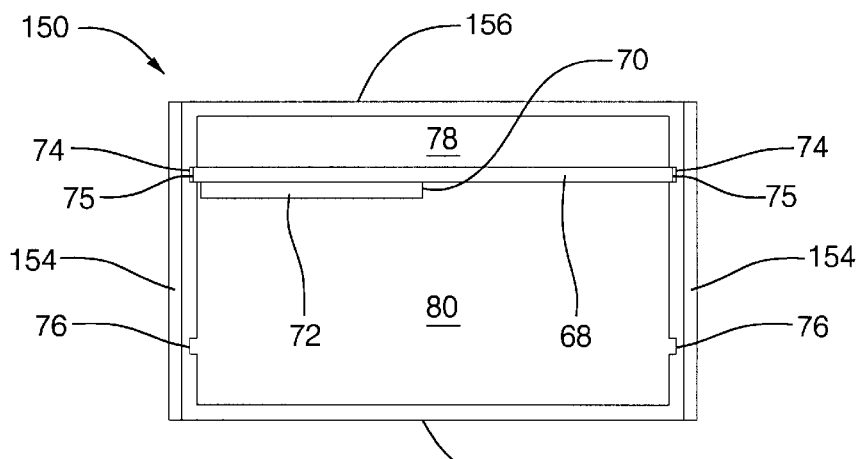
Figure 5:
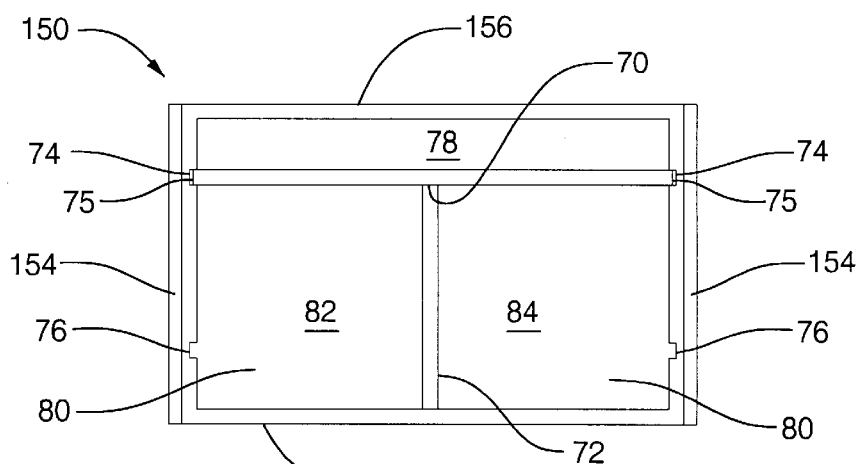

Now, referring to FIGS. 5A–5C, another embodiment of a glove box bin (150) according to the present invention is generally depicted having a partition (68) inserted therein. Again, as with FIGS. 1–4, the illustrated shape of glove box bin (150) is depicted for convenience only, and one skilled in the art will readily recognize that various shapes and dimensions are possible and within the scope of the invention. In this embodiment, glove box bin (150) is depicted as a generally rectangular box having a base (152), arcuate sidewalls (154) and arcuate endwalls (156) and (158). Partition (68) having a secondary partition (72) in a closed position is depicted as being inserted within slots (74) formed within sidewalls (154). Additionally, opposing slots (76) are depicted, which provide an alternative location for partition (68).

FIG. 5B depicts a top plan view of glove box bin (150) depicted in FIG. 5A, whereby the configuration of partition (68) is self-explanatory. Distal ends (75) of partition (68) are shown as inserted within slots (74), thereby creating a first compartment (78) and a second compartment (80). Partition (68) includes connecting member (70), which may be provided as heretofore described, interconnecting secondary partition (72) to partition (68). Secondary partition (72) may be maintained in the closed position, for example, by integral snap fits closures or hook and loop closures (not shown). In this embodiment, secondary partition (72), when closed, does not integrate with slot (74) as does the end of main partition (68).

FIG. 5C depicts a top plan view of the glove box bin of FIG. 5A having secondary partition (72) in the open position, whereby first compartment (78) and sub-compartments (82) and (84) are created within compartment (80) and defined in part by secondary partition (72). In preferred embodiments, secondary partition (72) abuts the interior of sidewalls (154) of glove box bin (150).

Figure 6:
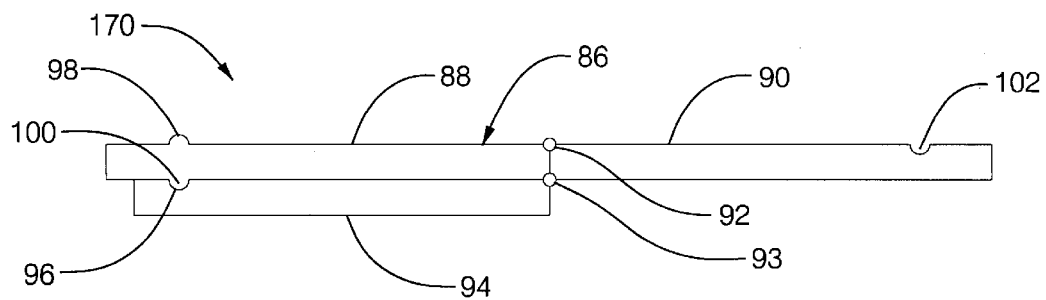
FIG. 6A is a top plan view of a foldable partition in a closed position.
FIG. 6B is a top plan view of a foldable partition having the secondary partition in an open position.
FIG. 6C is a top plan view of a foldable partition completely folded.
Figure 6:
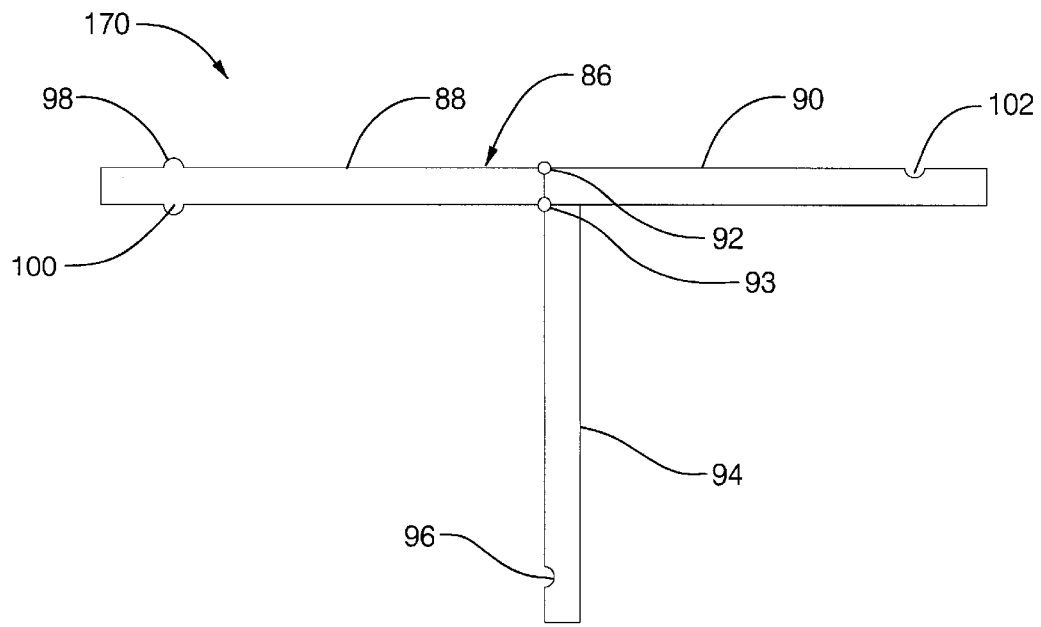
Figure 6:
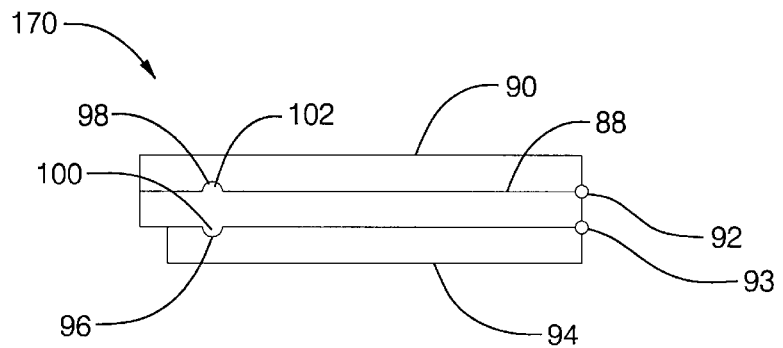

FIGS. 6A through 6C depict plan views of a partition assembly (170) including a divided main partition (86) (divided into partition members (88) and (90)) having a secondary partition (94) connected thereto by connecting members (93) and further having integral closures (96), (98), (100) and (102) formed therein. In other words, main partition (86) comprises a pair of generally planar members (88) and (90) interconnected by connecting member (92). FIGS. 6A and 6B depict members (88) and (90) extending generally continuously to form main partition (86). FIG. 6A depicts partition assembly (170) comprising members (88) and (90) in an open position and secondary partition (94) so that secondary partition (94) is generally parallel to members (88) and (90). Secondary partition (94) is maintained in a closed position by one or more engagements integral with the adjoining surfaces of member (88) and secondary partition (94). The integral closure is effectuated by a generally semi-spherical recess (96) provided upon the surface of secondary partition (94) that adjoins member (88), and a corresponding and complementary semi-spherical protrusion (100) provided upon the surface of member (88) that adjoins secondary partition (94). Therefore, when secondary partition (94) is closed from the open position depicted in FIG. 6B to the closed position depicted in FIG. 6A, semi-spherical protrusion (100) may be frictionally or snap-fittingly engaged with semi-spherical recess (96) to secure secondary partition (94) to member (88).

FIG. 6B illustrates members (88) and (90) in an open position and secondary partition (94) in an open position. This embodiment, for example, may be inserted into glove box bin (150) as depicted in FIG. 5C, for example, whereby compartment (78) and separate sub-compartments (82) and (84) are created (see FIG. 5C).

FIG. 6C illustrates members (88) and (90) in a closed position, wherein members (88) and (90) lie flush against each other. In addition, secondary partition (94) is in a closed position relative to members (88) and (90). That is, partition assembly (170) may be compacted by sandwiching member (88) between member (90) and secondary partition (94). Secondary partition (94) is maintained in the closed position as described heretofore with reference to FIG. 6A. Similar or identical recesses and protrusions may be provided to maintain flat bodies (88) and (90) closed about connecting member (92). A generally semi-spherical recess (102) is provided upon the surface of member (90) that adjoins member (88), and a corresponding semi-spherical protrusion (98) is provided upon the surface of member (88) that adjoins member (90). Therefore, when flat body (90) is closed from the open position depicted in FIG. 6A to the closed position depicted in FIG. 6C, such that members (90) and (88) and secondary partition (94) are folded, semi-spherical protrusion (98) may be frictionally or snap-fittingly engaged with semi-spherical recess (102) to maintain the closed or folded position.

This configuration of partition assembly (170) is useful, for example, when it is desired to completely remove partition assembly (170) from either glove box bin (10) as illustrated in FIGS. 1A, 1B, 2A, 3B, 4A or 4B, or glove box bin (150) as illustrated in FIGS. 5A, 5B and 5C. It may be advantageous to store partition assembly (170) folded as shown in FIG. 6C, as it is more compact and sturdy.

Figure 7:
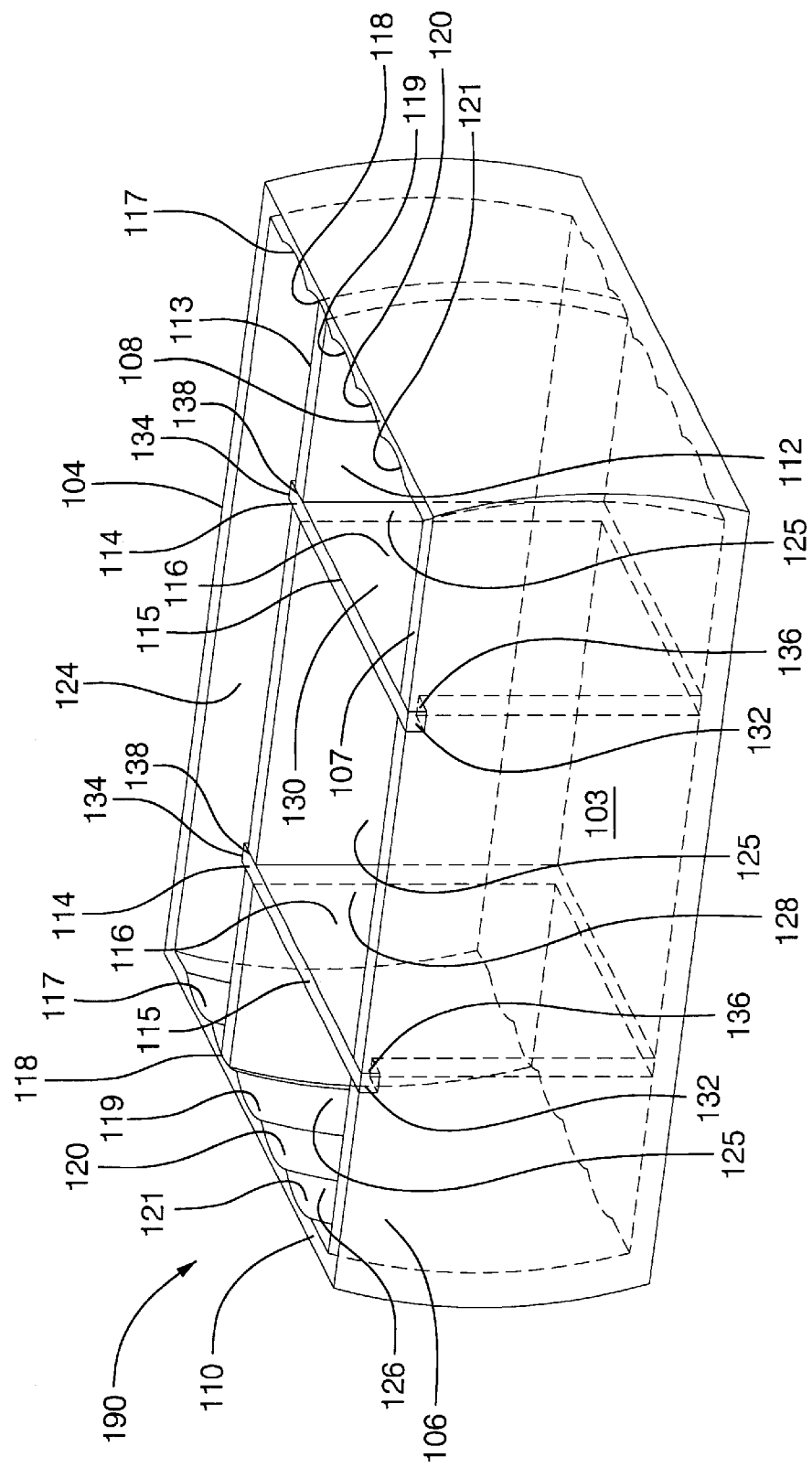
FIG. 7 is a front perspective view of a glove box bin according to an additional embodiment of the present invention.

In another embodiment, the secondary partition maybe provided separate from the primary partition as opposed to pivotally attached by one or more hinge portions. For example, FIG. 7 depicts a glove box bin (190) shaped generally as an open rectangular box having a base (103), generally perpendicular end panels (108) and (110) and cross body panels (104) and (106). A series of opposing concave arcuate grooves (117), (118), (119), (120) and (121) are molded within side panels (108) and (110). A primary partition (112) traverses side panels (108) and (110) and is depicted as frictionally secured within opposing grooves (118), thereby creating a first main compartment (124) between primary partition (112) and cross body panel (104) and a second main compartment (125) between primary partition (112) and cross body panel (106). A pair of secondary partitions (114) are disposed between primary partition (112) and cross body panel (106), creating three subcompartments (126), (128) and (130) within second main compartment (125). It is understood that there are number of arrangements of primary and secondary partitions that are possible. For example, two primary partitions (112) may be inserted into any of opposing grooves (117), (118), (119), (120) and (121) and secondary partitions (114) may be of differing sizes to fit between primary partitions (112) or to fit between primary partitions (112) and cross body panels (104) and (106) having top cross body panel receiving edges (105) and (107) respectively. Alternatively, single secondary partition (114) can be used rather than two as depicted in FIG. 7. One of skill in the art will readily recognize the various combinations possible.

FIG. 7 also illustrates the coupling of secondary partition (114) with glove box bin (190). The structure that allows secondary partition (114) to interlock between primary partition (112) and cross body panel (106) is apparent. Secondary partition (114) comprises a generally planar member contoured at the bottom corners to mimic the cross sectional shape of the region between primary partition (112) and cross body panel (106). Secondary partition (114) includes a top insertion portion (115) extensions (132) and (134) forming lip portions (136) and (138) that correspond with top cross body panel receiving edge (107) and top primary partition receiving edge (113), respectively. To effectuate a secure engagement, lip portion (136) is urged into the top edge of cross body panel (106) and lip portion (138) is urged into the top edge of primary partition (112). Preferably, for secure frictional engagements between secondary partition (114) and respective primary partition (112) and cross body panel (106), the widths of lip portions (136) and (138) are marginally greater than the thickness of both primary partition (112) and cross body panel (106).

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A glove box bin comprising:
   a body having an inner surface and opposing distal edges, the body having a retaining slot formed therein;
   a pair of end panels disposed against said opposing distal edges forming a storage region defined by said inner surface and said pair of end panels; and
   at least one primary partition removably disposed between said pair of end panels, said at least one primary partition dividing said storage region into a plurality of compartments, said at least one primary partition including an adjustable secondary partition extending therefrom, wherein in a first position, said adjustable secondary partition is disposed within said retaining slot formed in said body so as to divide one of said plurality of compartments into first and second subcompartments, and wherein in a second position, said adjustable secondary partition is free from said retaining slot.

2. A glove box bin as in claim 1, wherein said pair of end panels have inside panel surfaces, said primary partition being removably retained within said storage region by at least one slot formed within at least one of said inside panel surfaces.

3. A glove box bin as in claim 2, wherein said pair of end panels further include top edges, said at least one slot being disposed generally at one of said top edges.

4. A glove box bin as in claim 2, wherein said at least one slot has a rectangular cross-section.

5. A glove box bin as in claim 4, wherein said primary partition has at least one interface edge having a thickness and said rectangular cross section has a width, further wherein the thickness of said interface edge is marginally less than the width of said rectangular cross-section, whereby a frictional engagement is effectuated between said primary partition and at least one of said pair of end panels.

6. A glove box bin as in claim 1, wherein said secondary partition is pivotally attached to said at least one primary partition, said secondary partition pivoting to said first position substantially perpendicular to said at least one primary partition and to said second position substantially adjacent to said at least one primary partition.

7. A glove box bin as in claim 1, wherein said pair of end panels comprise generally "U-shaped" members which seat against said body which has a complementary "U-shaped" cross-section.

8. A glove box bin as in claim 1, wherein said inner surface of said body has an arcuate shape and said retaining slot is formed in said inner surface so that said retaining slot extends downwardly from an upper edge of said body.

9. A glove box bin as in claim 8, wherein said retaining slot is formed generally perpendicular to said upper edge.

10. A glove box bin as in claim 1, wherein said at least one primary partition is removably inserted into a pair of primary retaining slots formed in said pair of end walls so as to permit said at least one primary partition to be securely disposed within said body extending between said pair of end walls.

11. A glove box bin as in claim 10, wherein each of said pair of end panels includes an upper edge, each of said primary retaining slots being formed in one of said end panels so that said at least one primary partition is angled at an obtuse angle relative to a plane containing said upper edges of said end panels when said at least one primary partition is removably disposed within said primary retaining slots.

12. A glove box bin as in claim 1, wherein the adjustable secondary partition has an outer edge which has a shape complementary to a shape of the body along the retaining slot.

13. A glove box bin as in claim 12, wherein the outer edge of the adjustable secondary partition is arcuate in nature.

14. A glove box bin comprising:

a body having an inner arcuate surface and opposing end walls which enclose the body at ends thereof to form a storage region defined by said inner surface and said opposing end walls; and a primary partition removably disposed within the body between said opposing end walls, said primary partition dividing said storage region into a plurality of compartments, said primary partition having a secondary partition adjustably coupled thereto, said primary partition engaging the opposing end walls so that said primary partition may be removed from said body, wherein in a first position, said secondary partition is removably secured to said inner surface of said body so as to divide one of said plurality of compartments into first and second subcompartments, and wherein in a second position, said adjustable secondary partition seats against said primary partition.

* * * * *